(12) United States Patent
Mestanov et al.

(10) Patent No.: US 11,019,483 B2
(45) Date of Patent: May 25, 2021

(54) ACCESS POINT SUPPORTING AT LEAST TWO VIRTUAL NETWORKS AND METHOD PERFORMED THEREBY FOR COMMUNICATING WITH WIRELESS DEVICE

(71) Applicant: Telefonaktiebolaget LM Ericsson (publ), Stockholm (SE)

(72) Inventors: Filip Mestanov, Brottby (SE); Stephen Rayment, Ottawa (CA); Chris Williams, Nepean (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/767,406

(22) PCT Filed: Sep. 30, 2016

(86) PCT No.: PCT/SE2016/050932
§ 371 (c)(1),
(2) Date: Apr. 11, 2018

(87) PCT Pub. No.: WO2017/065670
PCT Pub. Date: Apr. 20, 2017

(65) Prior Publication Data
US 2018/0302783 A1  Oct. 18, 2018

Related U.S. Application Data

(60) Provisional application No. 62/241,811, filed on Oct. 15, 2015.

(51) Int. Cl.
*H04W 8/22* (2009.01)
*H04W 84/12* (2009.01)
(Continued)

(52) U.S. Cl.
CPC ............ *H04W 8/22* (2013.01); *H04L 63/083* (2013.01); *H04L 63/0876* (2013.01);
(Continued)

(58) Field of Classification Search
CPC ........ H04W 8/22; H04W 84/12; H04W 48/20
(Continued)

(56) References Cited

U.S. PATENT DOCUMENTS 7,379,435 B1 * 5/2008 Kinder ............... H04L 12/189
370/324
8,037,305 B2  10/2011 Rahman et al.
(Continued)

FOREIGN PATENT DOCUMENTS

JP    4779711 B2     7/2011
KR    101453523 B1  10/2014
RU    2534737 C2    12/2014

OTHER PUBLICATIONS

ISO/IEC/IEEE (dated: Nov. 1, 2012) (Year: 2012).*
(Continued)

*Primary Examiner* — Jae Y Lee
*Assistant Examiner* — Jean F Voltaire
(74) *Attorney, Agent, or Firm* — Murphy, Bilak & Homiller, PLLC

(57) ABSTRACT

An access point (300, 400) and a method (100) performed thereby for communicating with a wireless device are provided. The access point supports two or more virtual networks. The method (100) comprising receiving (110) a probe request from the wireless device, the probe request comprising an indication whether the wireless device supports Multiple Basic Service Set Identifier, M-BSSID, capability or not; and sending (130) a probe response to the wireless device in accordance with the indication comprised in the probe request.

4 Claims, 6 Drawing Sheets

(51) Int. Cl.
  *H04W 48/20* (2009.01)
  *H04L 29/06* (2006.01)
  *H04W 12/08* (2021.01)
  *H04W 12/06* (2021.01)

(52) U.S. Cl.
  CPC ............ *H04W 12/06* (2013.01); *H04W 12/08* (2013.01); *H04W 48/20* (2013.01); *H04W 84/12* (2013.01)

(58) Field of Classification Search
  USPC .......................................................... 370/338
  See application file for complete search history.

(56) References Cited

U.S. PATENT DOCUMENTS

| | | | | |
|---|---|---|---|---|
| 8,442,553 | B2 | 5/2013 | Cardona et al. | |
| 2006/0285507 | A1* | 12/2006 | Kinder | H04W 48/12 370/310 |
| 2007/0081477 | A1* | 4/2007 | Jakkahalli | H04L 12/4645 370/310 |
| 2008/0144591 | A1 | 6/2008 | Jokela | |
| 2010/0020746 | A1 | 1/2010 | Zaks | |
| 2014/0362840 | A1* | 12/2014 | Wong | H04W 88/06 370/338 |
| 2015/0223068 | A1 | 8/2015 | Thelen et al. | |
| 2015/0365805 | A1* | 12/2015 | Bajko | G01S 13/767 455/456.1 |
| 2016/0330077 | A1* | 11/2016 | Jin | H04W 36/30 |

OTHER PUBLICATIONS

Virtual AP Presentation (Year: 2006).*
ISO/IEC/IEEE (Year: 2012).*
Hiertz, Guido R. et al., "Multiple BSSID Element", doc.: IEEE 802.11-14/1014r0, Aug. 1, 2015, 1-16.
Stanley, Dorothy et al., "TGu/TGv Ad-hoc Meeting", doc.: IEEE 802.11-08/0491r 1, May 6, 2008, 1-18.
Narasimhan, Partha , et al., "Virtual AP Presentation", IEEE 802.11-05/1219r4, Mar. 7, 2006, 19 pages.
Unknown, Author , "Information Technology—Telecommunications and Information Exchange between Systems—Local and Metropolitan Area Networks—Specific Requirements—Part 11: Wireless LAN Medium Access Control (MAC) and Physical Layer (PHY) Specifications", International Standard, ISO/IEC/IEEE 8802-11:2012(E), First Edition, Nov. 1, 2012, 2798 pages.
Kneckt, Jarkko, et al., "Active Scanning related requirements for Specification Frame Work Document", IEEE 802.11-12/0153r0, Jan. 2012, 5 pages.

* cited by examiner

ACCESS POINT SUPPORTING AT LEAST TWO VIRTUAL NETWORKS AND METHOD PERFORMED THEREBY FOR COMMUNICATING WITH WIRELESS DEVICE

TECHNICAL FIELD

The present disclosure relates to wireless communication and in particular to wireless communication between an access point and a wireless device, wherein the access point supports at least two virtual communication networks.

BACKGROUND

In Institute of Electrical and Electronics Engineers, IEEE, WLAN (also known as Wi-Fi and these terms will be used interchangeably throughout this document) is standardised in the 802.11 specifications (IEEE Standard for Information technology—Tele-communications and information exchange between systems. Local and metropolitan area networks—Specific requirements. Part 11: Wireless LAN Medium Access Control (MAC) and Physical Layer (PHY) Specifications). WLAN is a technology that currently mainly operates in the 2.4 GHz or the 5 GHz band. The IEEE 802.11 specifications regulate the access points' or wireless terminals' physical layer, MAC layer and other aspects to secure compatibility and inter-operability between access points and portable terminals, (henceforth referred to as wireless devices). WLAN generally operates in unlicensed bands, and as such, communication over WLAN may be subject to interference sources from any number of both known and unknown devices. WLAN is commonly used as wireless extensions to fixed broadband access, e.g. in domestic environments and hotspots, like airports, train stations, and restaurants.

In many situations WLAN systems provide support for multiple virtual networks. Different wireless devices support different versions of the standard for the wireless communication network, and so do different access points. It is important that a wireless device supporting an early version of the standard is still operational in wireless communication networks operating according to newer versions of the standard, i.e. wireless communication networks being supported by access points according to the newer versions of the standard.

SUMMARY

The object is to obviate at least some of the problems outlined above. In particular, it is an object to provide an access point and a method performed thereby for communicating with a wireless device, wherein the access point supports at least two virtual communication networks. These objects and others may be obtained by providing an access and a method performed by an access according to this disclosure.

According to an aspect, a method performed by an access point for communicating with a wireless device, wherein the access point supports two or more virtual networks is provided. The method (100) comprising receiving (110) a probe request from the wireless device, the probe request comprising an indication whether the wireless device supports Multiple Basic Service Set Identifier, M-BSSID, capability or not; and sending (130) a probe response to the wireless device in accordance with the indication comprised in the probe request.

According to an aspect, an access point operable for communicating with a wireless device, wherein the access point supports two or more virtual networks is provided. The access point is configured for receiving a probe request from the wireless device, the probe request comprising an indication whether the wireless device supports Multiple Basic Service Set Identifier, M-BSSID, capability or not; and for sending a probe response to the wireless device in accordance with the indication comprised in the probe request.

The method performed by the access point and the access point itself may have several possible advantages. One possible advantage is that it may improve, or even optimise, the usage of airtime resources by adapting the probe response to the capability of the wireless device. Another possible advantage is that the access point may avoid sending messages to the wireless device that the wireless device will possible not understand.

BRIEF DESCRIPTION OF DRAWINGS

Embodiments will now be described in more detail in relation to the accompanying drawings, in which.

DETAILED DESCRIPTION

Briefly described, an access point and a method performed by the access point for communicating with a wireless device are provided. The access point and the wireless device are operable in a wireless communication network. The access point supports two or more virtual wireless communication networks. Each wireless communication network may be associated with a respective identification, ID. An example of an ID is a Basic Service Set, BSS, ID. Thus, when the access point supports two or more virtual communication networks, the access point may for example broadcast two or more BSSIDs. Supporting two or more virtual communication networks is also referred to as Multiple BSSID, M-BSSID. In a virtual network, the access point may be referred to as a virtual access point, VAP, which is a logical entity residing within a physical access point. To a client or wireless device (e.g. a WLAN STA), the VAP appears as an independent access point with its own unique BSSID and SS ID. Several virtual access points may be supported in one physical access point.

There may be a plurality of wireless device seeking, or requesting, access to one of the virtual communication networks. Different wireless devices support different versions of the standard for the wireless communication network, and so do different access points. It is important that a wireless device supporting an early version of the standard is still operational in wireless communication networks operating according to newer versions of the standard, i.e. wireless communication networks being supported by access points according to the newer versions of the standard.

Figure 1A:
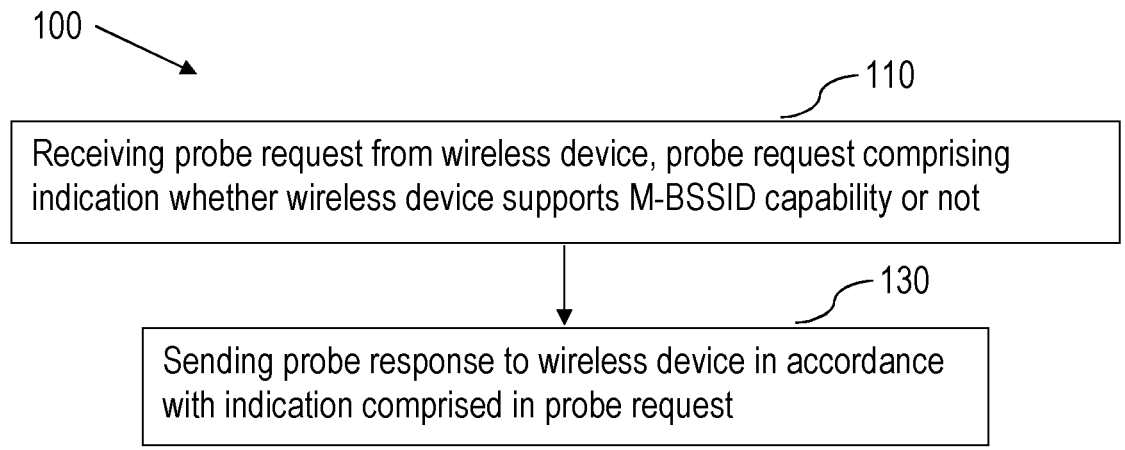
FIG. 1a is a flowchart of a method performed by an access point for communicating with a wireless device according to an exemplifying embodiment.
Figure 1B:
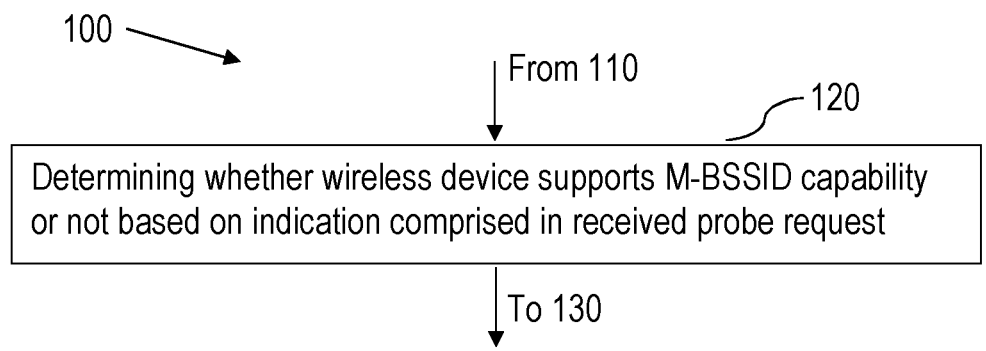
FIG. 1b is a flowchart of a method performed by an access point for communicating with a wireless device according to yet an exemplifying embodiment

Embodiments herein relate to a method performed by an access point for communicating with a wireless device. The access point supports two or more virtual networks. Different embodiments will now be described with reference to FIGS. 1a and 1b FIG. 1a illustrates the method 100 comprising receiving 110 a probe request from the wireless device, the probe request comprising an indication whether the wireless device supports Multiple Basic Service Set Identifier, M-BSSID, capability or not; and sending 130 a probe response to the wireless device in accordance with the indication comprised in the probe request.

When a wireless device moves about it may at some point come in proximity to the access point such that the wireless device and the network node may be within range to hear each other, i.e. send and receive signals between each other. There are two examples of a wireless device discovering available communication networks. A first example is by receiving individual broadcast messages associated with the different wireless networks. Another example is to send probe request(s) to the access point(s) that are within distance to receive the probe request.

Thus, the wireless device may send a probe request to the access point. The access point consequently receives the probe request from the wireless device, the probe request comprising an indication whether the wireless device supports M-BSSID capability or not.

The access point may act differently for wireless device that does support the M-BSSID capability and for wireless device that does not support the M-BSSID capability. For wireless devices that support M-BSSID, the probe response may look different than for wireless device that does not support the M-BSSID capability. In other words, for a wireless device that does not support the M-BSSID capability, it would possibly not understand a probe response according to the M-BSSID capability.

Consequently, the access point sends a probe response to the wireless device in accordance with the indication comprised in the probe request. In this manner, the access point ensures that the probe response corresponds to the version of the standard supported by the wireless device that sent the probe request.

The method performed by the access point has several possible advantages. One possible advantage is that it may improve, or even optimise, the usage of airtime resources by adapting the probe response to the capability of the wireless device. Another possible advantage is that the access point may avoid sending messages to the wireless device that the wireless device will possible not understand.

The sending (130) of the probe response may comprise (a) sending one probe response comprising information on a plurality of BSSIDs for respective Basic Service Set, BSS, associated with the two or more virtual networks supported by the access point; or (b) sending one probe response per BSSID associated with the respective virtual network supported by the access point.

Different wireless devices may be able to understand both or only one of a single probe response comprising information on a plurality of BSSIDs or one probe response per BSSID. Consequently, the access point may select the option best suited for the wireless device that sent the probe request. The wireless device may indicate in the probe request if it is able to understand one single probe response comprising information on a plurality of BSSIDs associated with the two or more virtual networks supported by the access point or not. If the wireless device is able to understand one single probe response comprising information on a plurality of BSSIDs, the access point may send such a probe response in order to more efficiently make use of bandwidth and/or radio/airtime resources.

In the wireless device does not indicate that it is able to understand one single probe response comprising information on a plurality of BSSIDs associated with the two or more virtual networks supported by the access point, the access point may send one probe response per BSSID associated with the respective virtual network supported by the access point.

In this manner, the access point only may only send one single probe response comprising information on a plurality of BSSIDs if the wireless device is able to understand such a probe response.

The method 100 may further comprise determining 120 whether the wireless device supports M-BSSID capability or not based on the indication comprised in the received probe request.

In order for the access point to handle the received probe request correctly, the access point may determine whether the wireless device supports M-BSSID capability or not based on the indication comprised in the received probe request. The indication may be of different variants or nature as will be discussed in more detail below. The access point receives the probe request, which comprises the indication of whether the wireless device supports M-BSSID capability or not.

Thus, the access point may determine whether the wireless device supports M-BSSID capability or not based on the indication comprised in the probe request.

In an example, the determining 120 may be based on whether the indication in the received probe request comprises information that the wireless device is Optimised Connectivity Experience, OCE, capable.

If the wireless device is an OCE capable wireless device, then the wireless device also supports the M-BSSID capability.

Fixed, mobile, and hotspot operators are deploying wireless communication networks, such as e.g. WLAN also referred to as Wi-Fi, in business models tailored to fit their unique needs. Members of Wi-Fi Alliance have formed a task group to explore technology and certification requirements to deliver a better user experience in managed network environments with a high density of active or connected devices. Managed networks based on Wi-Fi CERTIFIED equipment will take advantage of systemic information to shorten connection setup, reduce airtime overhead, optimise transitions, and improve roaming performance. This is generally referred to as the OCE.

In another example, the determining 120 may be based on whether the indication in the received probe request comprises information that the wireless device is a High Efficiency, HE, wireless device.

A HE wireless device also supports the M-BSSID capability. A High Efficiency WLAN Task Group (HEW TG) is a task group within Institute of Electrical and Electronics Engineers, IEEE, 802.11 working group that will consider the improvement of spectrum efficiency to enhance the system throughput/area in high density scenarios of access points and/or wireless devices.

According to yet another example, the determining 120 may be based on whether the indication in the received probe request comprises information that the wireless device supports IEEE 802.11ax standard.

The IEEE 802.11ax standard is the successor to 802.11ac and is aiming at increasing the efficiency of WLAN/Wi-Fi networks. Thus, if the wireless device supports the IEEE 802.11ax standard, it also supports the M-BSSID capability.

IEEE 802 started a task group to investigate and deliver next generation WLAN technologies for the scenarios of dense networks with a large number of stations and access point. The proposal is specified as the IEEE 802.11ax amendment. Due to the significant network capacity increase achieved by 802.11ax, the term high-efficiency WLAN (HEW) is also used in reference to this new amendment. This paper summarizes the IEEE 802.11ax standardisation activities in progress and presents an overview of the most important features proposed in the 802.11ax amendment. Expected features and challenges for 802.11ax in the design of physical layer (PHY) and media access control sub-layer (MAC), toward a new era of wireless LANs, are also discussed According to still another example, the determining 120 may be based on an information element comprised in the indication in the received probe request, the information element indicating that the wireless device supports M-BSSID capability.

The indication may comprise an explicit information element indicating to the access point that the wireless device does support the M-BSSID capability. Thus the access point may easily determine whether the wireless device supports the M-BSSID capability or not.

According to a further example, the determining 120 may be based on information comprised in the indication in the received probe request that the wireless device supports IEEE 802.11ai standard, also referred to as Fast Initial Link Setup, FILS.

FILS is an amendment to the IEEE 802.11 standard that may enable a wireless device to achieve secure link setup in less than 100 ms. A successful link setup process will then allow the wireless device to send Internet Protocol, IP, traffic with a valid IP address through the access point. If the indication in the received probe request that the wireless device supports IEEE 802.11ai standard, the access point may determine that the wireless device also supports the M-BSSID capability.

The method 100 may further comprise including into the probe response information on a plurality of BSSIDs for respective Basic Service Set, BSS, supported by the access point, responsive to determining that the wireless device supports M-BSSID capability.

When the wireless device supports M-BSSID capability, the access point may send one single probe response comprising information about all the virtual communication networks that the access point supports. In other words, the access point may send one single probe response comprising the respective BSSIDs of individual virtual communication networks that are supported by the access point. The wireless device, supporting the M-BSSID capability will be able to understand such a probe response and successfully receive all the BSSIDs that the access point supports, and which the wireless device may possibly gain access to.

In an example, the method 100 further comprises including individual respective probe responses for the BSSs supported by the access point into the probe response responsive to determining that the wireless device does not support the M-BSSID capability.

When the wireless device does not support M-BSSID capability, the wireless would not understand one single probe response as described directly above. Instead, the access point sends, as the probe response, a plurality of probe responses, each probe response comprising one BSSID. In other words, the access point may send as many as one probe response per virtual communication network the access point supports; wherein each probe response may comprise only one BSSID.

The wireless communication network may be a Wireless Local Area Network, WLAN.

There are different examples of wireless communication networks. One such example is WLAN, which is also referred to as Wi-Fi and defined be the IEEE 802.11 standard.

Figure 2A:
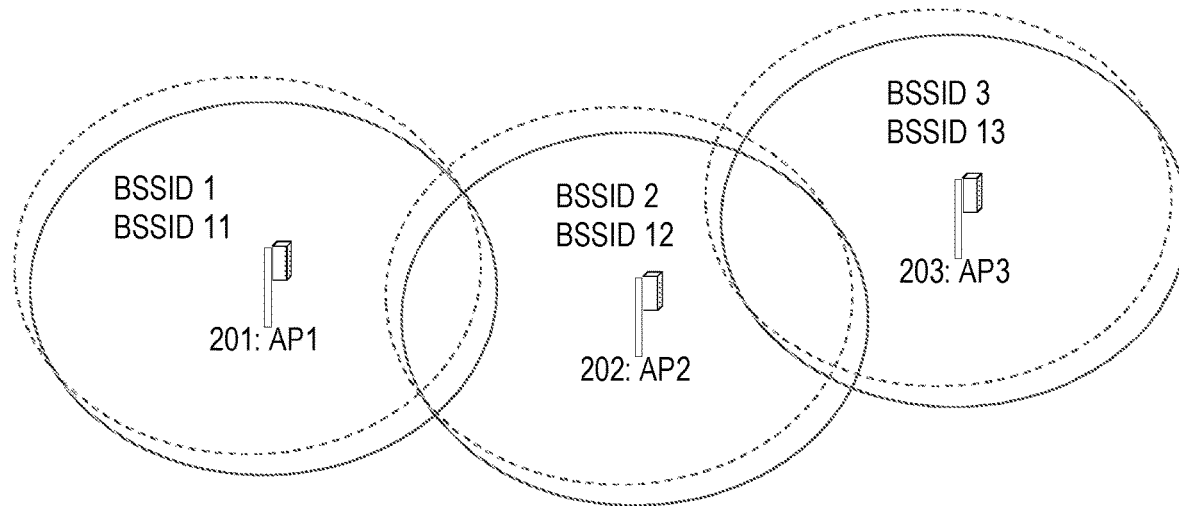
FIG. 2a is an illustration of an example of access points supporting two virtual communication networks.

In FIG. 2a, an example of access points supporting two virtual communication networks are schematically illustrated. In this figure, three physical devices AP1, AP2, AP3 support two virtual communication networks—the one denoted with dashed line and comprising BSSID1, BSSID2 and BSSID3 (hereon referred to as WLAN1) and the one denoted with the solid line comprising BSSID 11, BSSID12 and BSSID13 (hereon referred to as WLAN10). Support for multiple virtual networks enables e.g. service differentiation and separation between the networks. For example, there may be an office deployment where WLAN1 is a security protected network to which only employees can connect; this network may provide access to corporate Intranet. At the same time, WLAN10 may be an open network to which everybody can connect without credentials. This network may provide Internet access for guests.

From the perspective of the 802.11 standard, both networks may be defined as separate WLAN networks, even though they are residing on the same physical hardware. This being the case, both networks provide their own management and control signalling, which may have a rather large impact on the airtime utilisation and network efficiency. If there are only two virtual networks, the problem might not be that noticeable, but with larger number of virtual networks, the airtime overhead of management frames may become significant. Being aware of the issue, the 802.11 standard developed a capability called the M-BSSID capability, which enables the access point to advertise information on several virtual networks using simplified signalling. A WLAN access point that supports M-BSSID may use one single Beacon or Probe Response frame in order to advertise information on several virtual BSSIDs. Multiple BSSID Information Element was introduced in IEEE 802.11k-2008 and is defined in IEEE 802.11-2012 section 8.4.2.48.

Even though the M-BSSID element provides means to reduce overhead created by advertising several virtual WLANs, it was only introduced in later amendments in the standard and hence all devices prior to that do not have the capability. The device complying to versions of the standard prior to the introduction of the M-BSSID capability are in this disclosure also referred to as legacy wireless devices.

In practical environments, the access point may be dealing with both legacy and non-legacy devices, where some will support the M-BSSID capability and some will not. While the will strive to make most efficient use of airtime by utilising the Multiple BSSID capability, it should provide means to inform all types of wireless devices on its capabilities.

Figure 2B:
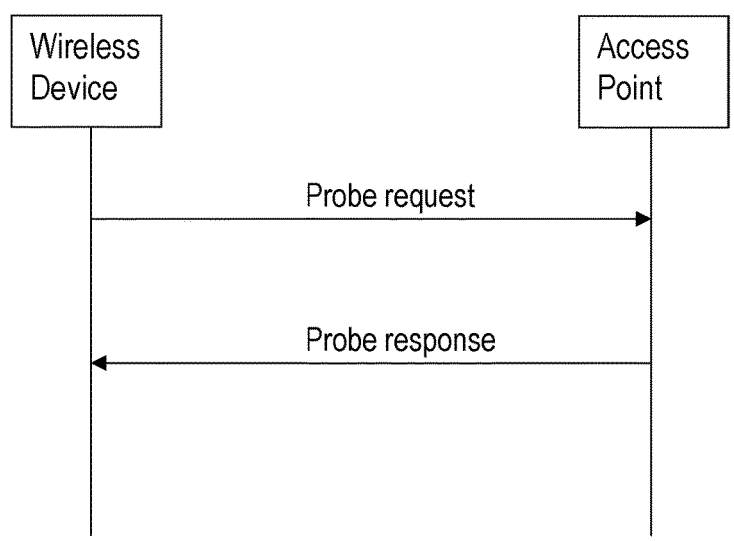
FIG. 2b is signalling diagram of an example of a procedure for a wireless device to discover a wireless communication network.

One embodiment of this disclosure is illustrated in FIG. 2b, which is a signalling diagram of an example of a procedure for a wireless device to discover a wireless communication network. In this embodiment of the disclosure, during active scanning the WLAN access point determines whether the device that performs the active scanning is a legacy device or not and based on that employs a capability advertisement strategy. To be more elaborate, when a wireless device performs active scanning, i.e. sends a probe request frame, the access points investigates the probe request frame in order to determine the way of responding (e.g. the count and content of probe response frame(s)).

Figure 2C:
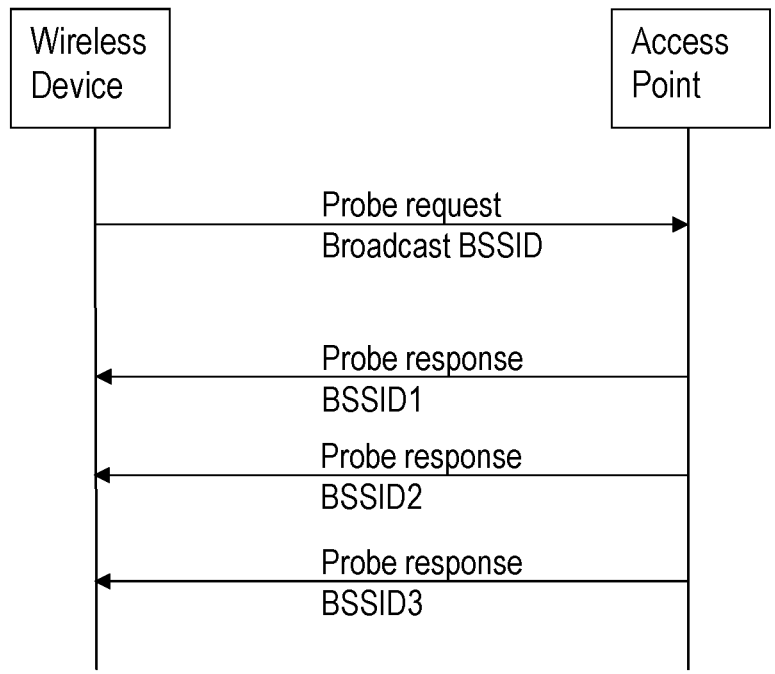
FIG. 2c is a signalling diagram of an example of a procedure for a wireless device to discover a wireless communication network, when the wireless device does not support the Multiple Basic Service Set Identifier, M-BSSID, capability.

Another embodiment of this disclosure is illustrated in FIG. 2c, which is a signalling diagram of an example of a procedure for a wireless device to discover a wireless communication network, when the wireless device does not support the M-BSSID capability. If the access point determines the wireless device to be a legacy wireless device (i.e. a wireless device that does not support the M-BSSID capability) it responds with a legacy probe response frame, which does not carry the M-BSSID information element. In the case that the access point supports multiple virtual BSSIDs, the access point sends multiple probe response frames to the wireless device, as depicted in FIG. 2c. In this illustrative example, the access point supports 3 virtual communication networks, hence it advertises 3 BSSIDs. When the wireless device is looking for access points (in active scanning) it has two options: 1. To look for an access point it has previously been associated to—then the probe request message carries the particular BSSID of the access point that the wireless device is looking for. 2. To look for all access points on the wireless channel—then the wireless device includes a broadcast BSSID address (which may match with all possible BSSIDs, the BSSID thus being kind of a wild-card). Then all access points may respond to the wireless device. Thus, in FIGS. 2c and 2d, the probe request is illustrated comprising broadcast BSSID.

Figure 2D:
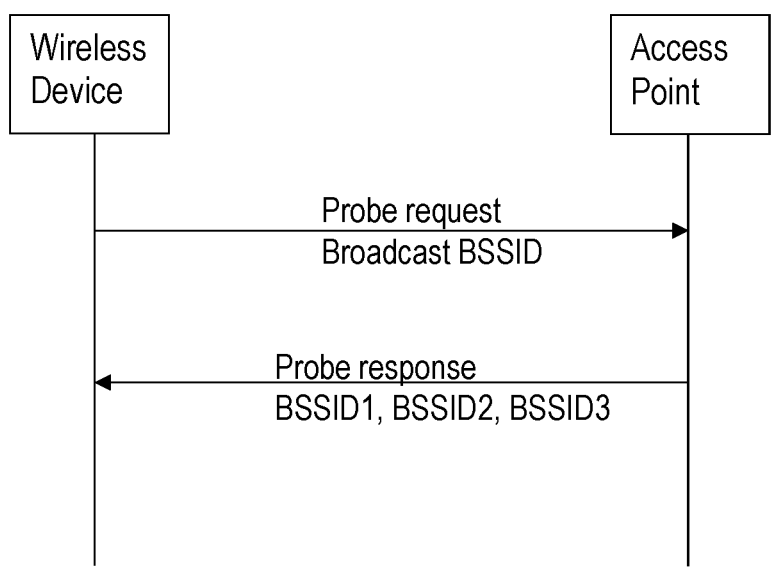
FIG. 2d is a signalling diagram of an example of a procedure for a wireless device to discover a wireless communication network, when the wireless device does support the M-BSSID capability

Yet another embodiment of this disclosure is illustrated in FIG. 2d, which is a signalling diagram of an example of a procedure for a wireless device to discover a wireless communication network, when the wireless device does support the M-BSSID capability. If the access point determines that the wireless device is a non-legacy wireless device, i.e. it supports the M-BSSID capability, the access point responds with a single probe response frame, carrying the M-BSSID information element, indicating all BSSIDs advertised by the access point. This situation is depicted in FIG. 2d. In this example, the access point supports 3 virtual communication network, hence advertises 3 BSSIDs via a single probe response frame, carrying an M-BSSID element.

In still another embodiment of this disclosure, the access point determines whether a wireless device is a legacy wireless device or not, based on the probe request frame sent by the wireless device. If the probe request frame does not contain an explicit indication of whether the wireless device supports or not the M-BSSID feature, the access point may make the decision based on implicit information. One example of such is if the wireless device indicates that it is an OCE capable wireless device. In this case, the wireless device may include an indication of its OCE capabilities, which also imply support for M-BSSID. Another example of such is if the wireless device indicates that it is an HE wireless device, i.e. the wireless device complies with the 802.11ax standard amendment.

Figure 2E:
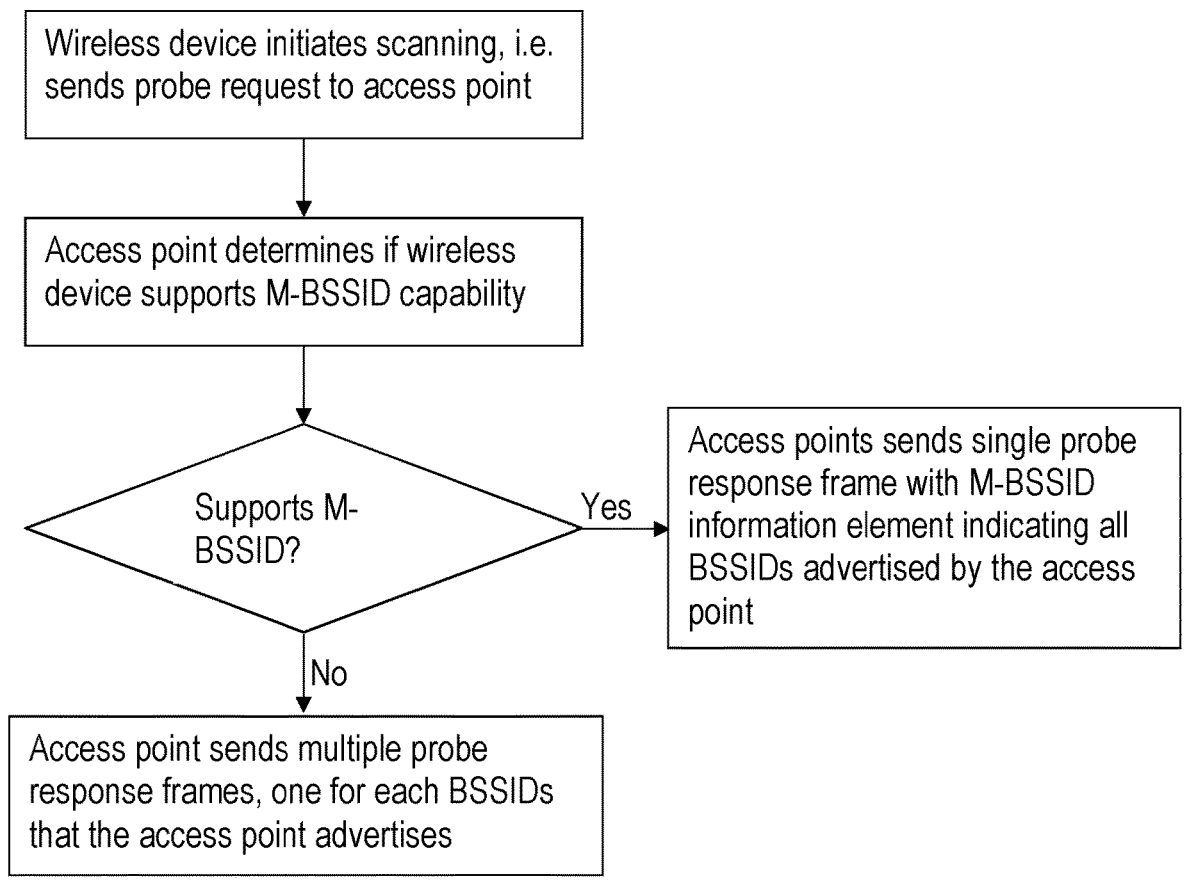
FIG. 2e is a flowchart of a method performed by an access point for communicating with a wireless device according to an exemplifying embodiment.

FIG. 2e is a flowchart of a method performed by an access point for communicating with a wireless device according to an exemplifying embodiment.

The method disclosed herein may help the access point to make efficient use of airtime resources, by determining when a single probe response frame is sufficient to advertise all the BSSID that the access point supports and when multiple probe response frames need to be sent in order to support legacy wireless devices.

Embodiments herein also relate to an access point for communicating with a wireless device. Exemplifying embodiments of such an access point will now be described with reference to FIGS. 3 and 4. The access point supports two or more virtual networks.

Figure 3:
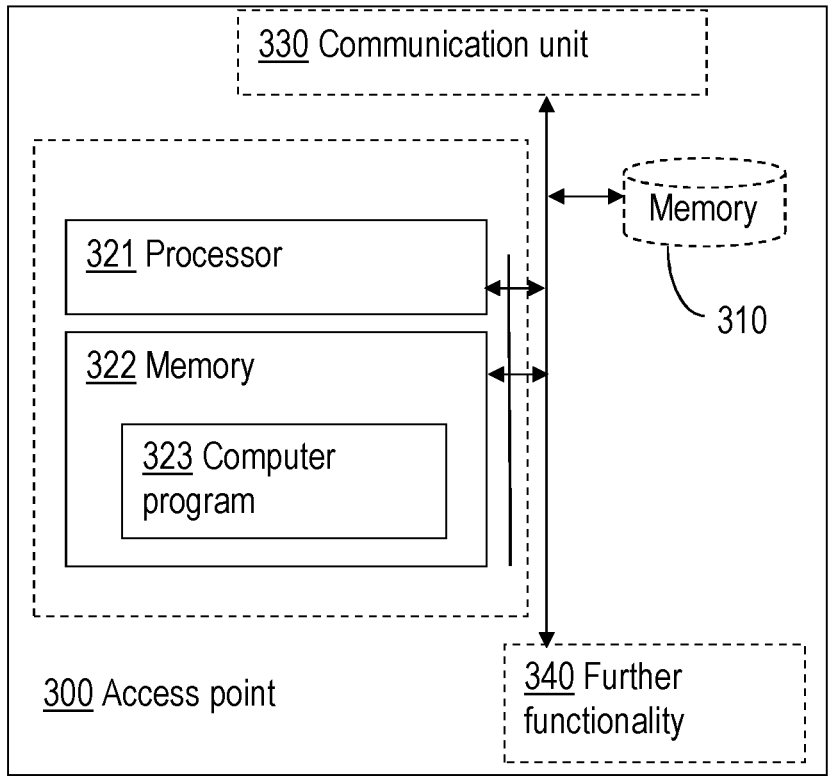
FIG. 3 is a block diagram of an access point configured for communicating with a wireless device according to an exemplifying embodiment.
Figure 4:
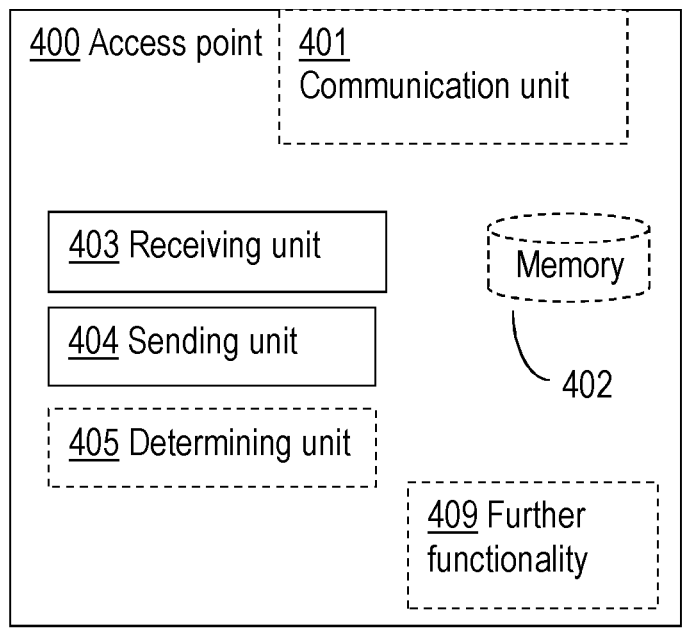
FIG. 4 is a block diagram of an access point configured for communicating with a wireless device according to another exemplifying embodiment.

FIGS. 3 and 4 illustrate the access point 300, 400 being configured for receiving a probe request from the wireless device, the probe request comprising an indication whether the wireless device supports Multiple Basic Service Set Identifier, M-BSSID, capability or not; and for sending a probe response to the wireless device in accordance with the indication comprised in the probe request.

The access point 300, 400 may be implemented or realised in different ways. An exemplifying implementation is illustrated in FIG. 3. FIG. 3 illustrates the access point 300 comprising a processor 321 and memory 322, the memory comprising instructions, e.g. by means of a computer program 323, which when executed by the processor 321 causes the access point 300 to receive a probe request from the wireless device, the probe request comprising an indication whether the wireless device supports M-BSSID capability or not; and to send a probe response to the wireless device in accordance with the indication comprised in the probe request.

An alternative exemplifying implementation of the access point is illustrated in FIG. 4. FIG. 4 illustrates the access point 400 comprising a receiving unit 403 for determining an available backhaul capacity of a reception point of the serving RBS and of at least one potential reception point of respective further RBS(s); for receiving a probe request from the wireless device, the probe request comprising an indication whether the wireless device supports M-BSSID capability or not. FIG. 4 also illustrates the network node 400 comprising a sending unit 404 for sending a probe response to the wireless device in accordance with the indication comprised in the probe request.

The access point has the same possible advantages as the method performed by the network node. One possible advantage is that it may improve, or even optimise, the usage of airtime resources by adapting the probe response to the capability of the wireless device. Another possible advantage is that the access point may avoid sending messages to the wireless device that the wireless device will possible not understand.

In an example, access point 300, 400 is further configured for the sending the probe response by (a) sending one probe response comprising information on a plurality of BSSIDs for respective Basic Service Set, BSS, associated with the two or more virtual networks supported by the access point;

or (b) sending one probe response per BSSID associated with the respective virtual network supported by the access point.

In an example, the access point 300, 400 may further be configured for determining whether the wireless device supports M-BSSID capability or not based on the indication comprised in the received probe request.

Just as described above, this may be implemented or realised in different ways. According to the example of FIG. 3, the memory comprises instructions, e.g. by means of a computer program 323, which when executed by the processor 321 causes the access point 300 to determine whether the wireless device supports M-BSSID capability or not based on the indication comprised in the received probe request.

According to the example of FIG. 4, the access point 400 comprises a determining unit 405 for determining whether the wireless device supports M-BSSID capability or not based on the indication comprised in the received probe request.

In yet an example, the access point 300, 400 is configured for determining whether the wireless device supports M-BSSID capability or not based on the indication in the received probe request comprises information that the wireless device is OCE capable.

In still an example, the access point 300, 400 is configured for determining whether the wireless device supports M-BSSID capability or not based on the indication in the received probe request comprising information that the wireless device is a High Efficiency, HE, wireless device.

In another example, the access point 300, 400 is configured for determining whether the wireless device supports M-BSSID capability or not based on the indication in the received probe request comprises information that the wireless device supports IEEE 802.11ax standard.

In a further example, the access point 300, 400 is configured for determining whether the wireless device supports M-BSSID capability or not based on an information element comprised in the indication in the received probe request, the information element indicating that the wireless device supports M-BSSID capability.

In yet an example, the access point 300, 400 is configured for determining whether the wireless device supports M-BSSID capability or not based on information comprised in the indication in the received probe request that the wireless device supports IEEE 802.11ai standard, also referred to as FILS.

In still an example, the access point 300, 400 is configured for including into the probe response information on a plurality of BSSIDs for respective BSS supported by the access point, responsive to determining that the wireless device supports the M-BSSID capability.

In another example, the access point 300, 400 is configured for including individual respective probe responses for the BSS supported by the access point into the probe response responsive to determining that the wireless device does not support the M-BSSID capability.

The wireless communication network may be a WLAN.

Figure 5:
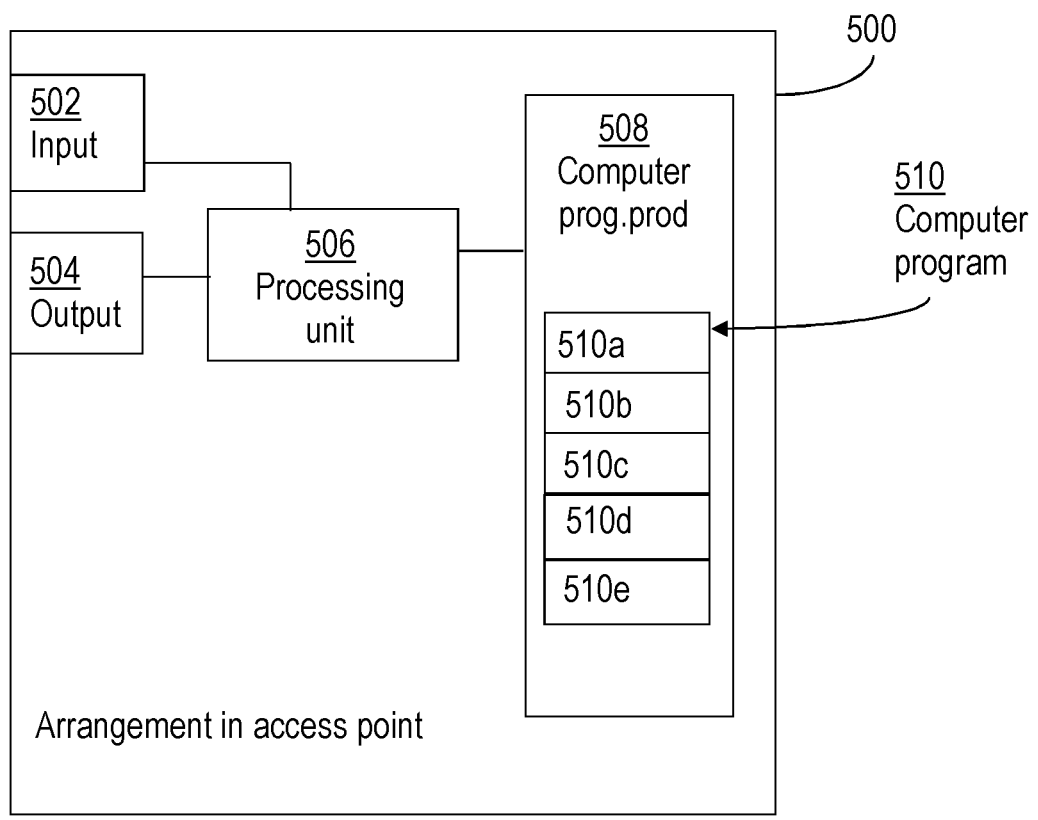
FIG. 5 is a block diagram of an arrangement in an access point configured for communicating with a wireless device according to an exemplifying embodiment.

A computer program 510 comprising computer readable code means is provided as illustrated in FIG. 5, which when run in a processing unit 506 comprised in an arrangement 500 in an access point 400 as described above causes the access point 400 to perform the corresponding method as described above A Computer program product 508 comprising the computer program 510 is also provided.

In FIG. 4, the network node 400 is also illustrated comprising a communication unit 401. Through this unit, the access point 400 is adapted to communicate with other nodes and/or entities in the wireless communication network. The communication unit 401 may comprise more than one receiving arrangement. For example, the communication unit 401 may be connected to both a wire and an antenna, by means of which the access point 400 is enabled to communicate with other nodes and/or entities in the wireless communication network. Similarly, the communication unit 401 may comprise more than one transmitting arrangement, which in turn may be connected to both a wire and an antenna, by means of which the access point 400 is enabled to communicate with other nodes and/or entities in the wireless communication network. The access point 400 further comprises a memory 402 for storing data. Further, the access point 400 may comprise a control or processing unit (not shown) which in turn is connected to the different units 403-404. It shall be pointed out that this is merely an illustrative example and the access point 400 may comprise more, less or other units or modules which execute the functions of the network node 400 in the same manner as the units illustrated in FIG. 4.

It should be noted that FIG. 4 merely illustrates various functional units in the network node 400 in a logical sense. The functions in practice may be implemented using any suitable software and hardware means/circuits etc. Thus, the embodiments are generally not limited to the shown structures of the network node 400 and the functional units. Hence, the previously described exemplary embodiments may be realised in many ways. For example, one embodiment includes a computer-readable medium having instructions stored thereon that are executable by the control or processing unit for executing the method steps in the network node 400. The instructions executable by the computing system and stored on the computer-readable medium perform the method steps of the network node 400 as set forth in the claims.

FIG. 5 schematically shows an embodiment of an arrangement 500 in a network node. Comprised in the arrangement 500 in the access point are here a processing unit 506, e.g. with a Digital Signal Processor, DSP. The processing unit 506 may be a single unit or a plurality of units to perform different actions of procedures described herein. The network node may also comprise an input unit 502 for receiving signals from other entities, and an output unit 504 for providing signal(s) to other entities. The input unit and the output unit may be arranged as an integrated entity or as illustrated in the example of FIG. 4, as one or more interfaces 401.

Furthermore, the arrangement in the network node comprises at least one computer program product 508 in the form of a non-volatile memory, e.g. an Electrically Erasable Programmable Read-Only Memory, EEPROM, a flash memory and a hard drive. The computer program product 508 comprises a computer program 510, which comprises code means, which when executed in the processing unit 506 in the arrangement in the network node causes the network node to perform the actions e.g. of the procedure described earlier in conjunction with FIGS. 1*a*-1*b*.

The computer program 510 may be configured as a computer program code structured in computer program modules 510*a*-510*e*. Hence, in an exemplifying embodiment, the code means in the computer program of the network node comprises a receiving unit, or module, for receiving a probe request from the wireless device, the probe request comprising an indication whether the wireless device supports M-BSSID capability or not. The computer program further comprises a sending unit, or module, for sending a probe response to the wireless device in accordance with the indication comprised in the probe request. The computer program may further comprise a determining unit, or module, for determining whether the wireless device supports M-BSSID capability or not based on the indication comprised in the received probe request.

The computer program modules could essentially perform the actions of the flow illustrated in FIG. 1a, to emulate the network node 400. In other words, when the different computer program modules are executed in the processing unit 506, they may correspond to the units 403-404 (and optionally 405) of FIG. 4.

Although the code means in the embodiments disclosed above in conjunction with FIG. 4 are implemented as computer program modules which when executed in the processing unit causes the network node to perform the actions described above in the conjunction with figures mentioned above, at least one of the code means may in alternative embodiments be implemented at least partly as hardware circuits.

The processor may be a single Central Processing Unit, CPU, but could also comprise two or more processing units. For example, the processor may include general purpose microprocessors; instruction set processors and/or related chips sets and/or special purpose microprocessors such as Application Specific Integrated Circuits, ASICs. The processor may also comprise board memory for caching purposes. The computer program may be carried by a computer program product connected to the processor. The computer program product may comprise a computer readable medium on which the computer program is stored. For example, the computer program product may be a flash memory, a Random-Access Memory RAM, Read-Only Memory, ROM, or an EEPROM, and the computer program modules described above could in alternative embodiments be distributed on different computer program products in the form of memories within the network node.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method performed by an access point for communicating with a wireless device, the access point supporting two or more virtual networks, the method comprising:
   receiving a probe request from the wireless device; and
   responsive to the probe request not indicating that the wireless device is Optimized Connectivity Experience (OCE) capable:
      deciding that the wireless device does not support Multiple Basic Service Set (M-BSSID) capability, and, correspondingly, sending one probe response per BSSID associated with the respective virtual networks supported by the access point.

2. The method according to claim 1, wherein the method further comprises:
   responsive to the probe request indicating that the wireless device is OCE capable:
      deciding that the wireless device supports M-BSSID capability, and, correspondingly, including, in the probe response, information on a plurality of BSSIDs for respective Basic Service Sets (BSSs) supported by the access point.

3. An access point configured for supporting two or more virtual networks, the access point comprising:
   communication circuitry configured for communicating with wireless devices accessing one or more of the virtual networks supported by the access point; and
   processing circuitry operatively associated with the communication circuitry and configured to:
      receive a probe request from a wireless device; and
      responsive to the probe request not indicating that the wireless device is Optimized Connectivity Experience (OCE) capable:
         decide that the wireless device does not support Multiple Basic Service Set (M-BSSID) capability, and, correspondingly, send one probe response per BSSID associated with the respective virtual networks supported by the access point.

4. The access point according to claim 3, wherein, responsive to the probe request indicating that the wireless device is OCE capable, the processing circuitry is configured to:
   decide that the wireless device supports M-BSSID capability, and, correspondingly, include, in the probe response, information on a plurality of BSSIDs for respective Basic Service Sets (BSSs) supported by the access point.

* * * * *

UNITED STATES PATENT AND TRADEMARK OFFICE
CERTIFICATE OF CORRECTION

PATENT NO. : 11,019,483 B2
APPLICATION NO. : 15/767406
DATED : May 25, 2021
INVENTOR(S) : Mestanov et al.

Page 1 of 2

It is certified that error appears in the above-identified patent and that said Letters Patent is hereby corrected as shown below:

On the Title Page

On Page 2, in Item (56), under "OTHER PUBLICATIONS", in Column 2, Line 7, delete "Partha ," and insert -- Partha, --, therefor.

On Page 2, in Item (56), under "OTHER PUBLICATIONS", in Column 2, Line 9, delete "Author ," and insert -- Author, --, therefor.

In the Specification

In Column 2, Line 17, delete "possible" and insert -- possibly --, therefor.

In Column 2, Line 28, delete "embodiment" and insert -- embodiment. --, therefor.

In Column 2, Line 42, delete "capability" and insert -- capability. --, therefor.

In Column 3, Line 8, delete "SS ID." and insert -- SSID. --, therefor.

In Column 4, Line 2, delete "possible" and insert -- possibly --, therefor.

In Column 5, Line 25, delete "point." and insert -- points. --, therefor.

In Column 5, Line 35, delete "discussed" and insert -- discussed. --, therefor.

In Column 6, Line 27, delete "be the" and insert -- by the --, therefor.

In Column 7, Line 1, delete "to" and insert -- with --, therefor.

In Column 8, Line 61, delete "possible" and insert -- possibly --, therefor.

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 11,019,483 B2

In Column 9, Line 65, delete "above" and insert -- above. --, therefor.

In Column 11, Line 35, delete "Memory RAM," and insert -- Memory, RAM, --, therefor.

In the Claims

In Column 12, Line 14, in Claim 1, delete "Set (M-BSSID)" and insert -- Set Identifier (M-BSSID) --, therefor.

In Column 12, Line 40, in Claim 3, delete "Set (M-BSSID)" and insert -- Set Identifier (M-BSSID) --, therefor.